United States Patent [19]
Ouellette et al.

[11] Patent Number: 5,996,558
[45] Date of Patent: Dec. 7, 1999

[54] HYDRAULICALLY ACTUATED GASEOUS OR DUAL FUEL INJECTOR

[75] Inventors: Patric Ouellette, Toronto; Brad Douville, Vancouver; Alain Touchette, Vancouver; Philip G. Hill, Vancouver; K. Bruce Hodgins, Delta, all of Canada

[73] Assignee: Westport Research Inc., Vancouver, Canada

[21] Appl. No.: 09/075,060

[22] Filed: May 8, 1998

[30] Foreign Application Priority Data

May 9, 1997 [CA] Canada ................................. 2204983

[51] Int. Cl.⁶ ............................ F02B 3/00; F02M 37/04
[52] U.S. Cl. ...................... 123/506; 123/446; 123/27 GE
[58] Field of Search ................................... 123/446, 447, 123/506, 467, 299–300, 27 GE

[56] References Cited

U.S. PATENT DOCUMENTS

| | | |
|---|---|---|
| 4,335,697 | 6/1982 | McLean . |
| 4,416,229 | 11/1983 | Wood . |
| 4,492,207 | 1/1985 | Hallberg . |
| 4,543,930 | 10/1985 | Baker . |
| 4,614,168 | 9/1986 | Batchelor . |
| 4,641,625 | 2/1987 | Smith . |
| 4,687,136 | 8/1987 | Ozu et al. . |
| 4,736,712 | 4/1988 | Savkar et al. . |
| 4,742,801 | 5/1988 | Kelgard . |
| 4,757,794 | 7/1988 | Hofer . |
| 4,909,209 | 3/1990 | Takahasi . |
| 5,060,610 | 10/1991 | Paro . |
| 5,067,467 | 11/1991 | Hill et al. . |
| 5,199,398 | 4/1993 | Nylund . |
| 5,315,973 | 5/1994 | Hill et al. . |
| 5,329,908 | 7/1994 | Tarr et al. . |
| 5,355,854 | 10/1994 | Aubee . |
| 5,383,647 | 1/1995 | Jorach et al. . |
| 5,478,213 | 12/1995 | Harris et al. ............................ 417/308 |
| 5,630,550 | 5/1997 | Kurishige et al. . |

FOREIGN PATENT DOCUMENTS

| | | |
|---|---|---|
| 9501817 | 11/1996 | Brazil . |
| 0546985A | 6/1993 | European Pat. Off. . |
| 0610585A | 8/1994 | European Pat. Off. . |
| 0718489A1 | 6/1996 | European Pat. Off. . |
| 0778410A1 | 6/1997 | European Pat. Off. . |
| 0787900A2 | 8/1997 | European Pat. Off. . |
| 2615917A | 2/1978 | Germany . |
| 4030890A | 4/1992 | Germany . |
| 62-126259A | 6/1987 | Japan . |

*Primary Examiner*—Thomas N. Moulis
*Attorney, Agent, or Firm*—McAndrews, Held & Malloy, Ltd.

[57] ABSTRACT

This invention relates to a novel hydraulically actuated fuel injector for an internal combustion engine. More particularly, the application pertains to a hydraulically actuated gaseous injector for injecting main fuel and optional pilot fuel into an internal combustion engine at different times at controlled pressure. A hydraulically actuated fuel injector for a piston displacement engine comprising: (a) an injector which is actuated by an actuator means and injects fuel into the engine at predetermined times; (b) a means for introducing hydraulic oil into said injector; (c) means for pressurizing said hydraulic oil; (d) means for opening a fuel inlet means and injecting the fuel into the engine upon the pressure of the hydraulic oil reaching a predetermined level; and (e) a means for preventing the pressure of the hydraulic oil from rising above the predetermined level.

56 Claims, 10 Drawing Sheets

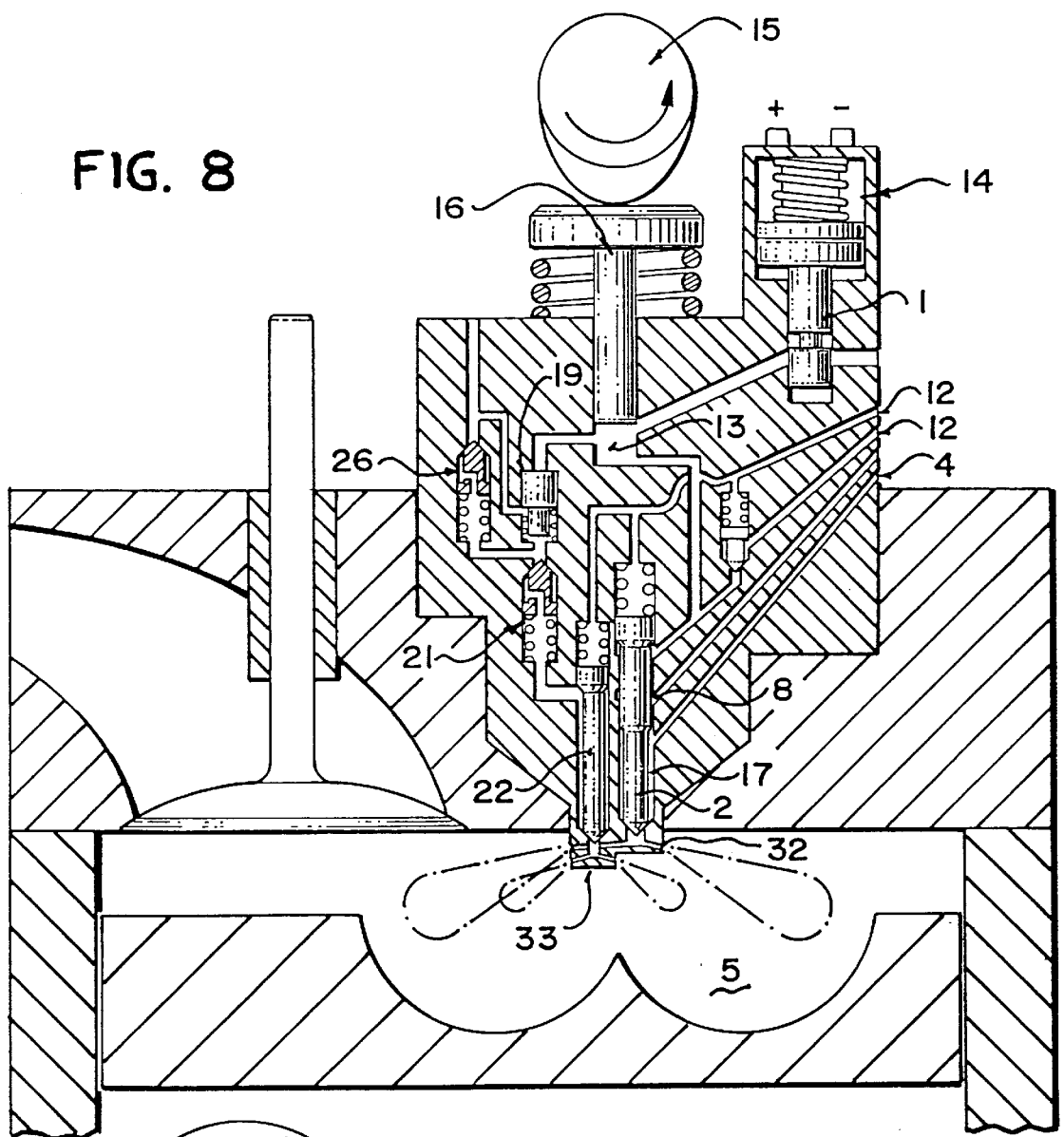
FIG. 8
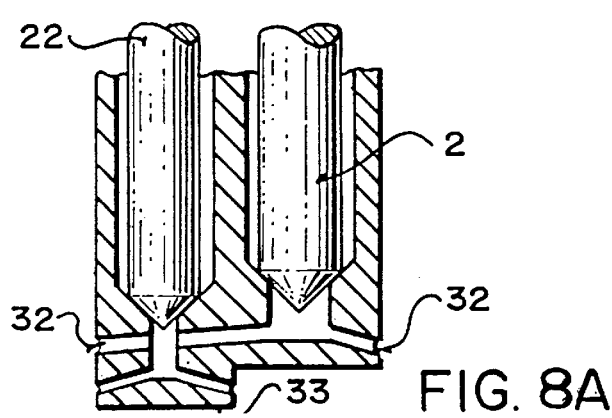
FIG. 8B
FIG. 8A

HYDRAULICALLY ACTUATED GASEOUS OR DUAL FUEL INJECTOR

FIELD OF THE INVENTION

This invention relates to a novel hydraulically actuated gaseous or dual fuel injector for an internal combustion engine. More particularly, the application pertains to a hydraulically actuated gaseous injector for injecting gaseous fuel and optionally pilot fuel into an internal combustion diesel engine at different times at controlled pressure.

BACKGROUND OF THE INVENTION

Because of its ready availability, low cost and potential for reducing particulate emissions, natural gas is a promising candidate for fuelling diesel engines. Methods that can be used to convert a diesel engine (a compression-ignition engine) to consume natural gas fall into three categories. One is to convert the engine to a stoichiometric or lean-burn spark-ignition engine. As a second option, the engine can be converted to natural gas using a "dual-fuel" technology, in which the natural gas is mixed with all of or with a portion of the intake air and is ignited by diesel fuel injected at the end of the compression stroke. A third method is the direct injection of the natural gas fuel in the combustion chamber, with a source of ignition. The preferred method, as discussed below, is the direct injection method because it is the only method which preserves the inherent favourable operating characteristics and high efficiency of diesel engines.

(1) Fuelling Diesel Engines with Premixed Air and Natural Gas—Spark-Ignition A diesel engine can be converted to natural gas by injecting the natural gas with the intake air and allowing the mixture to enter the chamber through the intake valve. The mixture, stoichiometric or lean, can then be ignited near top dead center using spark plugs. However, to avoid detonation of the mixture, the compression ratio of the engine must be reduced. A reduction in compression ratio is accompanied by a reduction in efficiency, or equivalently by an increase in fuel consumption. Furthermore, to maintain the strength of the mixture under all conditions, the intake air must be throttled, causing pumping losses and further increasing the fuel consumption required to maintain equivalent power. These losses are especially pronounced at low or part load levels, which are the predominant operating conditions of automotive engines. Typically, the conversion of diesel engines to stoichiometric or lean-burn combustion of natural gas with spark plug ignition offers a considerable reduction in harmful emissions, but also leads to an increase in fuel consumption.

(2) Fuelling Diesel Engines with Premixed Air and Natural Gas—Pilot Ignition In this method, the natural gas is generally admitted in the intake air and enters the combustion chamber through the intake ports or valve. The mixture is ignited near top-dead center by the injection of pilot diesel fuel. There are, however, fundamental complications with this method:

1. At low load, with unthrottled diesel operation, the gas fuel and air mixture is too lean for satisfactory combustion. The fuel consumption increases under these conditions and the hydrocarbon emissions also increase. Remedies to his situation include:
   a. Reverting to diesel fuel operation at low loads—in some applications where substantial part load conditions exist this remedy defies the purpose of the fuel substitution.
   b. Throttling of the intake air, which is complicated when the engine is equipped with turbochargers because of the danger of compressor surge (although with modern electronic-controlled wastegates this may be avoidable). In any case, such throttling removes an inherent advantage of diesel operation.
   c. Skip-firing, which consists of not firing the cylinders at each cycle but rather at every other cycle. This method does not usually permit smooth engine operation, particularly on 4 cylinder engines, and is usually too unstable for idling, requiring straight diesel operation.
2. Because a premixed fuel-air mixture exists during the compression, there is a danger of knocking (an uncontrolled combustion of the mixture), with potential engine damage. Thus, reduction in compression ratio may be required. If a reduction in compression ratio is chosen, the engine efficiency is compromised. If the compression ratio is maintained, the amount of natural gas used under each condition must be limited such that the mixture formed is not prone to knocking. This means that more diesel fuel must be used to sustain high load cases.

This pilot ignition method and the previously discussed spark ignition method are not well suited for 2-stroke engines because a substantial amount of the intake charge flows out the exhaust valve in two-cycle engines and is wasted. To avoid this bypass, and to improve on the low load combustion characteristics, it has been proposed to inject the natural gas directly in the combustion chamber after all valves or ports are closed, but still at a relatively low pressure. This adds difficulty because a new injection system control is needed, modifications to the head or block are required, and metering the gaseous fuel and ensuring stratification is difficult.

So far as is known, this second method has been proven capable of maintaining the efficiency over a wide range of load and speeds only by retaining a substantial amount of diesel fuel to compensate for the above problems.

(3) Direct Injection of Natural Gas into Diesel Engine Cylinders

The great advantage of direct injection of fuel into the engine cylinders in diesel operation is that it permits efficient and stable burning over the whole load range. This is because the burning occurs in local regions in which the fuel-air ratio is within the prescribed flammability limits. Natural gas has the advantage over diesel fuel in that it does not require atomization into micron-size droplets and thus does not require very high injection pressures. For diesel injection, pressures as high as 1000 atm are required for most efficient operation. For natural gas, pressures of 200 atm are satisfactory. The principal difficulty with the direct injection of natural gas is that the gas will not self-ignite, as diesel fuel does, at the typical temperature and pressure range of a diesel engine. To overcome this difficulty, another source of ignition must be provided. Examples of ignition sources are some small quantity of self-igniting pilot diesel fuel injected with or separate from the natural gas, glow plugs or hot surfaces, and the like. For economical reasons, it is desirable to limit the modifications necessary to the engine. In that respect, an ignition source that can be injected through a unique injector with the natural gas or other gaseous fuel is an advantage.

Review of Prior Art

Successful operation of large bore diesels with direct injection of compressed natural gas has been demonstrated in North America, as discussed in the following publications:

1. J. F. Wakenell, G. B. O'Neal, and Q. A. Baker, "High Pressure Late Cycle Direct Injection of Natural Gas in a Rail Medium Speed Diesel Engine", SAE Technical Paper 872041;
2. Willi, M. L., Richards, B. G., "Design and Development of a Direct Injected, Glow Plug Ignition Assisted, Natural Gas Engine", ICE-Vol.22, Heavy Duty Engines: A look at the Future, ASME 1994; and
3. Meyers, D. P., Bourn G. D., Hedrick, J. C., Kubesh, J. T., "Evaluation of Six Natural Gas Systems for LNG Locomotive Applications", SAE Technical Paper 972967.

Meyers et al at the Southwest Research Institute demonstrated the superiority of the direct injection of natural gas over other means of fueling a locomotive engine with natural gas. The direct injection of natural gas led to the best thermal efficiency for the targeted reduction of nitrogen oxide emissions. They used two injectors to accomplish the injection of the two fuels. The gas injector was hydraulically actuated and electronically controlled and was mounted at an angle in the combustion chamber. The original diesel fuel injector was used with however smaller holes to reduce the amount of diesel pilot fuel injected.

The work by Wakenell et al, carried out at Southwest Research Institute, involved direct injection of natural gas into a large bore (8.5") 2-stroke, locomotive diesel engine. The natural gas was stored in liquid form (LNG), then pumped to high pressures of 5000 psi (340 atm). Full rated power was achieved with less than 2% pilot diesel fuel (98% natural gas) and thermal efficiency was slightly lower than 100% diesel operation. The gas injector valve replaced the diesel injector and a small diesel injector was installed in the "test-cock" hole in the cylinder head. The gas injector was a hydraulically actuated gas injector, with the high-pressure being supplied by an independent hydraulic pump.

Willi and Richards at Caterpillar demonstrated the possibility of using glow plugs to ignite the directly injected natural gas in a diesel engine. The results indicated equal or better thermal efficiency and nitrogen oxide emissions and reduced particulate matter. The injector used for this application is a modified HEUI injector from Caterpillar (which is the object of SAE papers 930270 and 930271 and inferentially in U.S. Pat. Nos. 5,181,494 and 5,191,867 and 5,245,970 and 5,143,291). The injector, designed for gas injection only, contains a mechanism to shape the injection rate of the gaseous injection. Pressurized oil is supplied from a common pump, and is intensified within the injector. There appears to be no means for injecting a pilot fuel or any pressure limiting device.

The following Norwegian publications disclose injection of gaseous fuel in diesel engines:
1. Einang, P. M., Korea, S., Kvamsdal, R., Hansen, T., and Sarsten, A., "High-Pressure, Digitally Controlled Injection of Gaseous Fuel in a Diesel Engine, with Special Reference to Boil-Off from LNG Tankers", Proceedings CIMAC Conf., June 1983;
2. Einang, P. M, Engja, H., Vestergren, R., "Medium Speed 4-stroke Diesel Engine Using High Pressure Gas Injection Technology", Proceedings CIMAC Conf., 1987.

Einang et al. [1983], in Norway, conducted tests involving the direct injection of natural gas into a 2-stroke marine diesel engine through a separate gas injector, the original diesel fuel injector being used for pilot ignition. With 73% natural gas proportion, the thermal efficiency of the natural gas fuelled engine was slightly better than diesel fuelling. The NOx emissions were reduced by some 24%. No details of the gas injector were released. The subsequent work [1987] involved the direct injection of natural gas with pilot diesel fuel in a four-stroke engine. A combined gas/oil injection valve was used, but no details of that injector are disclosed in the publication.

In Finland, the following publication is of interest:
1. Verstergren, R., "The Merits of the Gas-Diesel Engine", ASME ICE-Vol. 25–3, 1995.

The Finnish work at Wartsila Diesel International pertains to the usage of directly injected natural gas with pilot diesel fuel and indicates the potential of the technology to use natural gas while retaining the high power output of diesel engines. Dual fuel injectors are not detailed in the paper, but appears in number of patents as discussed later.

From Japan and Denmark, the following publications are of interest:
1. Miyake, M., Endo, Y., Biwa, T., Mizuhara, S., Grone, O., Pedersen, P. S., "Recent Development of Gas Injection Diesel Engines", CIMAC Conf., Warsaw, 1987;
2. Biwa, T., Beppu, O., Pedersen, P. S., Grone, O., Schnohr, O., Fogh, M., "Development of the 28/32 Gas Injection Engine", MAN B&W;
3. Miyake, M., Biwa, T., Endoh, Y., Shimotsu, M., Murakami, S., Komoda, T., "The Development of High Output, Highly Efficient Gas Burning Diesel Engines", 15th CIMAC Conference, Paris, 1983, Proceedings, vol. A2, pp. 1193–1216;
4. Fukuda, T., Komoda, T., Furushima, K., Yanagihara, M., Ito, Y., "Development of the Highly Efficient Gas Injection Diesel Engine with Glow Plug Ignition Assist for Cogeneration Systems", JSME-ASME International conference in Power Engineering, ICOPE-93.

The Japanese work of Miyake et al. (Mitsui Engineering and Shipbuilding Co.) showed good results, with equivalent engine efficiency at 85% of engine load using 5% pilot diesel fuel in a large diesel engine (420 mm bore). Two injection systems are presented; the first one is the utilization of 2 separate injectors. In that instance, a gas injector design is discussed and is based on a hydraulically actuated needle. The source of hydraulic actuation is an engine driven actuator-pump. A single injector design capable of injecting both the pilot diesel fuel and the natural gas is also presented. The injector is also actuated by an external source of pressurized oil, and is based on concentric needles. The schematic designs do not incorporate pressure-limiting. Also, the design is not well suited for smaller diesel engines, as the needle seats are not at the tip of the injector. This means that a substantial amount of fuel remains in the injector and can be injected late in the expansion stroke. This situation is not very important in an engine with high fuel consumption, but it leads to increased pollutant emissions and loss of efficiency in a smaller engine operating from idle to rated speed.

The same Japanese authors presented further refinements and tests in 1987. A new combined injector was presented based on two separate needle valves located upstream from the injector tip, one controlling the pilot diesel fuel and one controlling the natural gas. As mentioned above, this design is not well suited for smaller size engines, because of the amount of fuel trapped between the needle valve and the injector tip, resulting in late injection. Also, it is difficult to provide fine atomization of the pilot diesel fuel with a needle valve located away from the tip.

The Mitsui Engineering team also tested a system using direct injection of natural gas only with glow plug ignition. In this case, a gas injection valve was used, but the schematic diagram reveals little information about the needle valve which is actuated by high-pressure oil supplied by an external pump.

The work of the Japanese and Danish team on the 28/32 Engine (MAN B&W Diesel and Mitsui) also featured a single injector capable of handling pilot diesel fuel and natural gas fuel. This time, the design was based on two separate needle valves located upstream from the nozzle. The design featured high-pressure oil as a means of sealing the high-pressure natural gas. The 28/32 engine is a fairly large bore (280 mm) engine used for generators and in marine applications. The actuating oil was also supplied from an independent pump. The injector design includes a needle valve well upstream of the nozzle which is not suitable for smaller engines as explained previously.

Injectors for injecting fuel into the combustion chamber of an internal combustion engine have been known for many years. A number of patents disclose fuel injectors:

U.S. Pat. No. 4,543,930, Baker, discloses an engine which includes a main fuel injector and a pilot fuel injector. The pilot and the main fuel may be the same fuel. The pilot injector injects from five to fifteen percent of the total fuel at different timings, depending upon the quantity of pilot fuel injected, the fuel cetane number and speed and load. The pilot fuel injector is directed toward the centerline of the diesel cylinder and at an angle toward the top of the piston. This avoids the walls of the cylinder. Stratification of the early injected pilot fuel is needed to reduce the fuel-air mixing rate, prevent loss of pilot fuel to quench zones and keep the fuel-air mixture from becoming too fuel lean to become effective. The pilot fuel injector can include a single hole for injection of the fuel and is directed at approximately 48 degrees below the head of the cylinder.

U.S. Pat. No. 4,416,229, Wood, discloses a system whereby diesel fuel is supplied to the cavity of an injector at a location near the valve seat. Alternative fuel is supplied to the cavity of the injector. The diesel fuel is supplied at a relatively low pressure which does not move the valve member to open position. The alternative fuel is supplied at a relatively high pressure which is sufficient to move the valve member to open position at intervals just prior to the movement of the piston of the cylinder of the chamber into which the fuel is to be injected into high centre position during its compression stroke. The fuel supply prevents the back flow of fuel, and thus maintains the cavity filled with fuel, except when alternative fuel is displaced within the cavity by the supply of diesel fuel. A plume of both fuels having the diesel fuel at its tip is injected into the chamber to enable the diesel fuel to be ignited by the compression in the chamber and the alternative fuel to be ignited by the diesel fuel.

U.S. Pat. No. 4,742,801, Kelgard, discloses a dual fuel engine which is operated with straight diesel fuel or with gaseous fuel and pilot injection of diesel fuel. The invention is primarily concerned with dual fuel engines for use in over-the-road vehicles but it has other applications. The invention also contemplates using the heat from the cooling water of the jackets of the engine to vaporize a liquid fuel into a gaseous state which is thereafter injected directly into the cylinders of the engine during operation on the dual fuel cycle.

U.S. Pat. No. 5,067,467, Hill et al., discloses a novel device for compressing and injecting gaseous fuel from a variable pressure gaseous fuel supply into a fuel receiving apparatus. The intensifier-injector compresses and injects gaseous fuel from a variable pressure source into the cylinder of a positive displacement engine. The intensifier-injector for gaseous fuels in an internal combustion engine comprises a device which utilizes the compressed gas from the chamber of the internal combustion engine, or compressed fluid or gas from an external compressor, to drive an intensifier means which raises the pressure of fuel gas supplied to the internal combustion engine for rapid late-cycle injection into the cylinder of the internal combustion engine. In this device, gaseous fuel and liquid pilot fuel are mixed together and injected through the same holes.

U.S. Pat. No. 5,315,973, Hill et al., discloses a related device for compressing and injecting gaseous fuel from a variable pressure gaseous fuel supply into the fuel receiving apparatus. The intensifier-injector for gaseous fuels in an internal combustion engine comprises a mechanism which utilizes the compressed gas from an external compressor to drive an intensifier means which raises the pressure of fuel gas supplied to the internal combustion engine for rapid late-cycle injection into the cylinder of the internal combustion engine. In this device, the gaseous fuel and liquid pilot fuel are mixed together and injected through the same holes.

U.S. Pat. No. 5,329,908, Tarr et al., discloses a related fuel injector which has a gas accumulator of a volume that is at least ten times the maximum amount of fuel which would have to be injectable thereby. A solenoid-operated poppet valve with an end face that opens into the combustion cylinder and is shaped to deflect a portion of the fuel injected into direct contact with the ignition plug is also disclosed. In a first embodiment, using a variable fuel supply, an electronic control unit (ECU) controls the injection timing to inject the compressed gas into the respective cylinders as each cylinder's piston nears its top dead centre position to obtain diesel engine-like efficiencies so long as the compressed gas supply pressure is sufficiently high. When the compressed gas supply pressure becomes too low for high efficiency operation, the ECU changes the manner of operation so that fuel is injected into the engine when the piston is near its bottom dead centre position so that it can be premixed with air prior to ignition to produce gasoline engine-like efficiencies.

Baker (U.S. Pat. No. 4,543,930) and Kelgard (U.S. Pat. No. 4,742,801) use two injectors instead of one as in the present application. Wood (U.S. Pat. No. 4,416,229), Hill et al. (U.S. Pat. No. 5,067,467) and Hill et al. (U.S. Pat. No. 5,315,973) inject the two fuels together instead of separately as in the present application. Tarr et al. (U.S. Pat. No. 5,329,908) uses solenoid actuation of a gas injector only.

Wartsila Diesel International Oy of Finland owns the following patents and patent applications relating to dual fuel injectors:

1. European patent application 92305415.9, filed Jun. 12, 1992, entitled "Improved Fuel Injection Valve Arrangement and Engine Using Such an Arrangement";
2. U.S. Pat. No. 5,199,398, filed Jun. 8, 1992, entitled "Fuel Injection Valve Arrangement";
3. EP0778410, filed Jun. 12, 1996, entitled "Injection Valve Arrangement for an Internal Combustion Engine";
4. EP0787900, filed Jan. 28, 1997, entitled "Injection Valve Arrangement";
5. EP0718489, filed Jun. 12, 1996, entitled "Injection Arrangement for an Internal Combustion Engine"; and
6. U.S. Pat. No. 5,060,610, filed Sep. 21, 1990, entitled "Combustion Process for Internal Combustion Engine Using Gaseous Fuel".

U.S. Pat. No. 5,199,398, Nylund and European Patent No. 0,520,659 A1, Nylund discloses a fuel injection valve arrangement for so called dual fuel engines using a pilot fuel needle and an axially movable, substantially hollow valve member permitting the injection of a gaseous fuel. The two needles are separately controllable.

European Patent No. 0,778,410, Nylund, discloses an injection valve arrangement for an internal combustion engine using a pilot needle and at least two valves for the injection of the gaseous fuel. The pilot fuel injection is controlled externally to the injector, while a main valve controls the admitting of hydraulic fluid to actuate the gas needle injection valves.

European Patent No. 0,718,489 A1, Hellen, discloses an injection arrangement for an internal combustion engine using a pilot needle and a separately controllable valve for the injection of a different medium. The pilot fuel injection is controlled externally to the injector, while a main valve controls the admitting of hydraulic fluid to actuate the different medium injection valve.

European Patent No. 0,787,900, Jay and Prillwitz, discloses an injection valve arrangement with two injection valves to inject an additional pressure medium into the combustion chamber of an internal combustion engine.

Nylund (U.S. Pat. No. 5,199,398, EP 0,520,659 A1, EP 0,778,410), Hellen EP 0,718,489 A1) and Jay and Prillwitz (EP 0,787,900) use two different sources of actuating fluid for the actuation of the usual liquid fuel and that of the additional fuel. In the present application a single source of hydraulic fluid is considered. Also, the metering of the liquid or pilot fuel is performed externally to the injector in the above patents, whereas it is performed internally in the current application. Furthermore, the above disclosure need not rely on a pressure-limiting device which is needed in the current application.

The following United States patents disclose dual fuel injectors and unit injectors for use with piston displacement engines:

Dual Fuel Injectors

U.S. Pat. No. 4,736,712 discloses a self purging dual fuel injector which injects sequentially two fuels through the same series of holes. Because the same series of holes is used for both fuels, the fuels must have a similar density in order to keep reasonable injection duration. The disclosed invention does not discuss the actuation of the needle used.

Unit Injectors

U.S. Pat. No. 5,558,067 shows a double pulsing electronic unit injector solenoid valve to fill the timing chamber before metering chamber.

U.S. Pat. No. 5,245,970 illustrates a priming reservoir and volume compensation device for a hydraulic unit injector fuel system.

U.S. Pat. No. 5,191,867 discloses a hydraulically-actuated electronically-controlled unit injector fuel system having variable control of actuating fluid pressure.

U.S. Pat. No. 5,181,494 shows a hydraulically-actuated electronically-controlled unit injector having stroke-controlled piston and methods of operation.

U.S. Pat. No. 5,143,291 illustrates a two-stage hydraulic electrically-controlled unit injector.

U.S. Pat. No. 5,096,121 discloses a two-stage hydraulic electrically-controlled unit injector.

U.S. Pat. No. 4,811,715 shows an electronic unit injector.

U.S. Pat. No. 4,699,320 illustrates a single solenoid unit injector.

U.S. Pat. No. 4,531,672 discloses a solenoid-operated unit injector having distinct timing, metering and injection periods.

U.S. Pat. No. 4,494,696 discloses a unit injector.

U.S. Pat. No. 4,427,152 shows a pressure time controlled unit injector.

U.S. Pat. No. 4,418,867 illustrates an electrically controlled unit injector.

U.S. Pat. No. 4,420,116 discloses a unit injector employing hydraulically controlled timing and fuel shut off.

U.S. Pat. No. 4,402,456 shows a double dump single solenoid unit injector.

U.S. Pat. No. 4,235,374 discloses an electronically controlled diesel unit injector.

The above patents pertain mostly to liquid fuel injectors and do not share the same requirements for pressure-limiting device and dual fuel capability as those presented in this application.

SUMMARY OF THE INVENTION

The invention is directed to a hydraulically actuated fuel injection apparatus for a piston displacement engine comprising: (a) an injector which is actuated by an actuator mechanism and injects fuel into the engine at predetermined times; (b) a port for introducing hydraulic fluid into said injector; (c) an injection valve for opening a fuel inlet and injecting the fuel into the engine upon the pressure of the hydraulic fluid reaching a predetermined level; and (d) a pressure limiting device for preventing the pressure of the hydraulic fluid from rising above the predetermined level.

The actuator mechanism can be actuated by the piston displacement engine or an engine-powered device and can be electrically or mechanically powered. The actuator mechanism can generate a rising hydraulic pulse to move the injection valve and can include a timing control for generation of the pulse at a predetermined time.

A pump can generate a rising hydraulic pressure pulse for a predetermined time and duration to thereby actuate the injection valve. The pump can be engine driven or electrically driven. Injection timing and quantity of fuel injected can be regulated by an electrically or a mechanically actuated valve.

A hydraulic fluid can be introduced into the injector through an electrically or mechanically actuated valve, the position of which can determine timing and duration. A hydraulic fluid carrying a rising pressure pulse generated by a pump at a predetermined time and of a predetermined duration can be introduced into the injector through a port. A cam and plunger mechanism driven by the engine can pressurize the hydraulic fluid.

The pressure-limiting device can be a check valve. The pressure-limiting device can comprise a spill-over port which can be opened when the injection valve moves past a predetermined location.

The injection valve can be a needle, the needle reciprocally moving from a closed to an open position to permit fuel to pass through the injector into a combustion chamber of the engine when the pressure of the hydraulic fluid reaches the predetermined level. When the needle moves to an open position when the pressure of the hydraulic fluid reaches the predetermined level, the fuel can pass through holes in a tip of a nozzle.

The injector can inject a pilot fuel and a main fuel into the engine. The pilot fuel can be a liquid and the main fuel can be a gas. The injector can inject pilot diesel fuel and natural gas as the main fuel into the engine.

The injector can include a second injection valve for injecting pilot fuel into the engine. The injector can include a second needle for injecting pilot fuel into the engine. The injector can injects two fuels into the engine through separate orifices. The injector can include a pilot fuel metering device.

The pressurized hydraulic fluid can overcome a pilot needle spring, which can open the pilot fuel needle and introduce pilot fuel into the combustion chamber of the engine. The pilot needle spring can close the pilot needle when the pressure of the hydraulic fluid drops below a second predetermined pressure, thereby terminating pilot fuel injection.

The pilot fuel metering device can include an intake port which can prime the injector and which can close when a limited-travel plunger is moved to a position which covers the intake port. The pilot fuel metering device can include a limited-travel plunger and a return spring to return the plunger to its original location once injection is completed. The pilot fuel metering device can include an intake valve which can enable hydraulic fluid to be replenished as required between the metering device and the pilot needle valve.

The two fuels can be injected into the engine with a concentric double-needle injection system or by a side-by-side double needle system.

The injection valve can be located at an end of the injector proximate to a combustion chamber of the engine. The needle can located at an end of the injector proximate to a combustion chamber of the engine.

One or more components of the injector can be sealed from one another by hydraulic fluid seals.

The pilot fuel can be diesel fuel which can function as hydraulic fluid.

The invention is also directed to a method of injecting fuel into a piston displacement engine comprising: (a) actuating an injector and injecting fuel into the engine at predetermined times; (b) introducing hydraulic fluid into said injector; (c) opening a fuel inlet and injecting the fuel into the engine upon the pressure of the hydraulic fluid reaching a predetermined level; and (d) preventing the pressure of the hydraulic fluid from rising above the predetermined level.

BRIEF DESCRIPTION OF DRAWINGS

In drawings which illustrate specific embodiments of the invention, but which should not be construed as restricting the spirit or scope of the invention in any way:

FIG. 8 shows a cross-section depiction of an embodiment of an injector for main fuel and pilot fuel with internal source of electronically-controlled hydraulic actuation and with pilot volume-controlling device and with side-by-side double needle arrangement.

FIGS. 8a and 8b illustrate side-section and top views of the side-by-side double needle construction.

DETAILED DESCRIPTION OF PREFERRED EMBODIMENTS OF THE INVENTION

Figure 1:
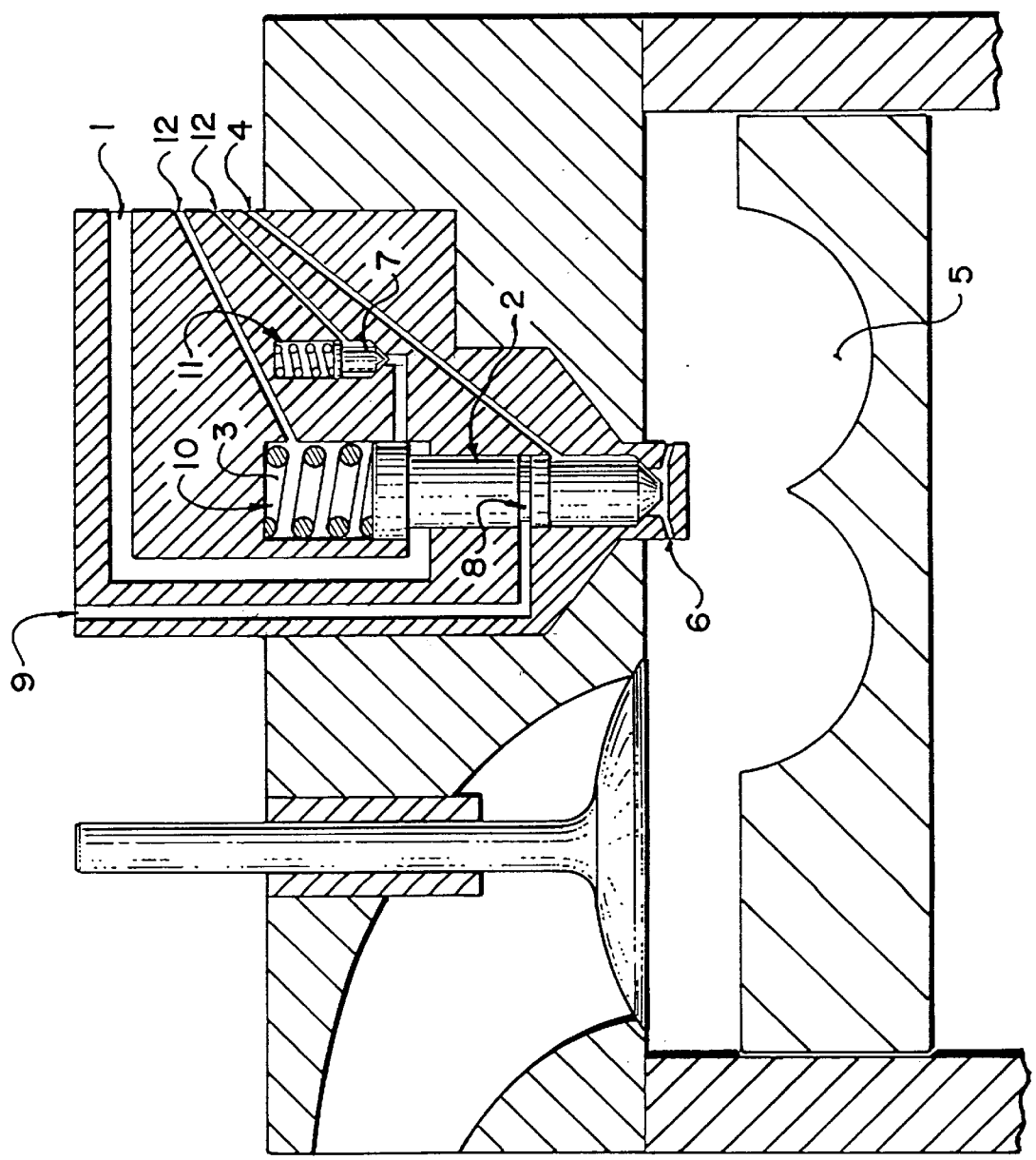
FIGS. 1 and 2 illustrate a cross-section depiction of an embodiment of an injector for main fuel only with external source of hydraulic actuation, for two different mechanisms of pressure-limiting device.

Internal combustion engines, including diesel engines and gasoline engines, have been known for about a century. Diesel engines are the workhorse of the commercial world. However, diesel engines, while efficient and inexpensive to operate, burn heavy diesel fuel which is a source of lung-damaging particulates and nitrogen oxide, which contribute to smog and acid rain.

The invention disclosed and claimed herein is directed to a hydraulically actuated gaseous injector for use with a piston or positive displacement engine, such as a diesel engine. The injector incorporates the following novel concepts:

1. A hydraulic pressure relief system that is used with a main fuel needle actuation mechanism;
2. A concentric double-needle arrangement that meters a pilot fuel and a main fuel at the injector tip and that permits sequential injection;
3. A side-by-side double-needle arrangement that meters a pilot fuel and a main fuel at the injector tip and that permits sequential injection;
4. A mechanism that controls the amount of pilot fuel injected at every stroke; and
5. Assorted methods of actuating the main gaseous fuel needle.

The hydraulic pressure relief is required in a hydraulically actuated gaseous fuel injector to limit the pressure rise in the injector. In a diesel fuel injector, the pressure is relieved when the injection takes place. The hydraulic pressure relief is also required in the present invention of a gaseous injector with pilot fuel capability as the pilot injection occurs only for a short duration at the beginning of the injection period and is insufficient to release the pressure. If the pressure is not relieved, and if the system is manufactured to fine tolerances between the mating surfaces of the moving parts, as it should be for proper injector response, the pressure levels reached at high loads are capable of damaging the injector parts.

The key elements of the needle arrangements in this invention relating to an injector capable of injecting a main fuel and a pilot fuel are:

1. The capability of injecting pilot fuel (which can be liquid) through small holes and at reasonably high pressure for fine atomization;

2. The capability of injecting a main fuel (which can be gaseous) through a separate series of holes of different dimensions to compensate for the difference in density between the main fuel and the pilot fuel;
3. The capability of injecting the pilot fuel before the main fuel, by a time delay adjustable through the selection of springs and actuation pressures;
4. The capability of injecting a finite volume of pilot fuel independently of the load, the volume being controlled such as to maintain a consistent ignition of the main fuel.
5. The capability of including a time delay between the injection of the pilot fuel and the main fuel emulates rate shaping, a technique in use with single fuels to reduce nitrogen oxides and noise from diesel engines. The capability of injecting only a fixed volume of pilot fuel permits controlling the consumption of the pilot fuel and its related emissions while retaining good ignition.

FIG. 1 illustrates a cross-section depiction of an injector for main fuel only with external source of hydraulic pressurization. The main fuel can be gaseous. It shows the basic injector design for main fuel only operation. As seen in FIG. 1, hydraulic oil from an in-line fuel injection pump (not shown) or from a distributor-type fuel injection pump (not shown) is fed through port 1. When the pump pressurizes the oil for injector actuation, a force is applied under the gas needle 2. When the pressure has reached a high-enough level, the spring 3 is overcome and the gas needle 2 lifts up. High-pressure main fuel introduced through port 4 is allowed to flow into the combustion chamber 5 as the needle 2 lifts up, through the injector nozzle 6. There may be any number of injection holes. Once the needle 2 is open, the hydraulic pressure keeps rising until the pump finishes the effective actuation stroke for that injector, the pressure drops and the needle 2 closes, that is, it is returned to its original position by the spring 3. For long injection duration, the pressure rises significantly between the time of opening of the needle 2 and the end of injection, and that pressure must be relieved to maintain the integrity of the injector components (springs, seats, ports). Pressure relief is provided in this embodiment by a relief valve 7 that opens at a predetermined maximum pressure level. The relief valve 7 is ported to a fuel/hydraulic return line 12. The high-pressure main fuel must be prevented from leaking into the actuating fluid, which is accomplished in this embodiment by a high-pressure liquid seal 8 which is fed through port 9 and at pressure higher than that of the main fuel. An alternative to the high-pressure liquid seal 8 is the usage of a suitable soft-material seal. A leakage of main fuel into the hydraulic fluid would result in slow response or failure of the actuation. Any leakage of hydraulic fluid in the spring cages 10 and 11 is vented through the return port 12.

Figure 2:
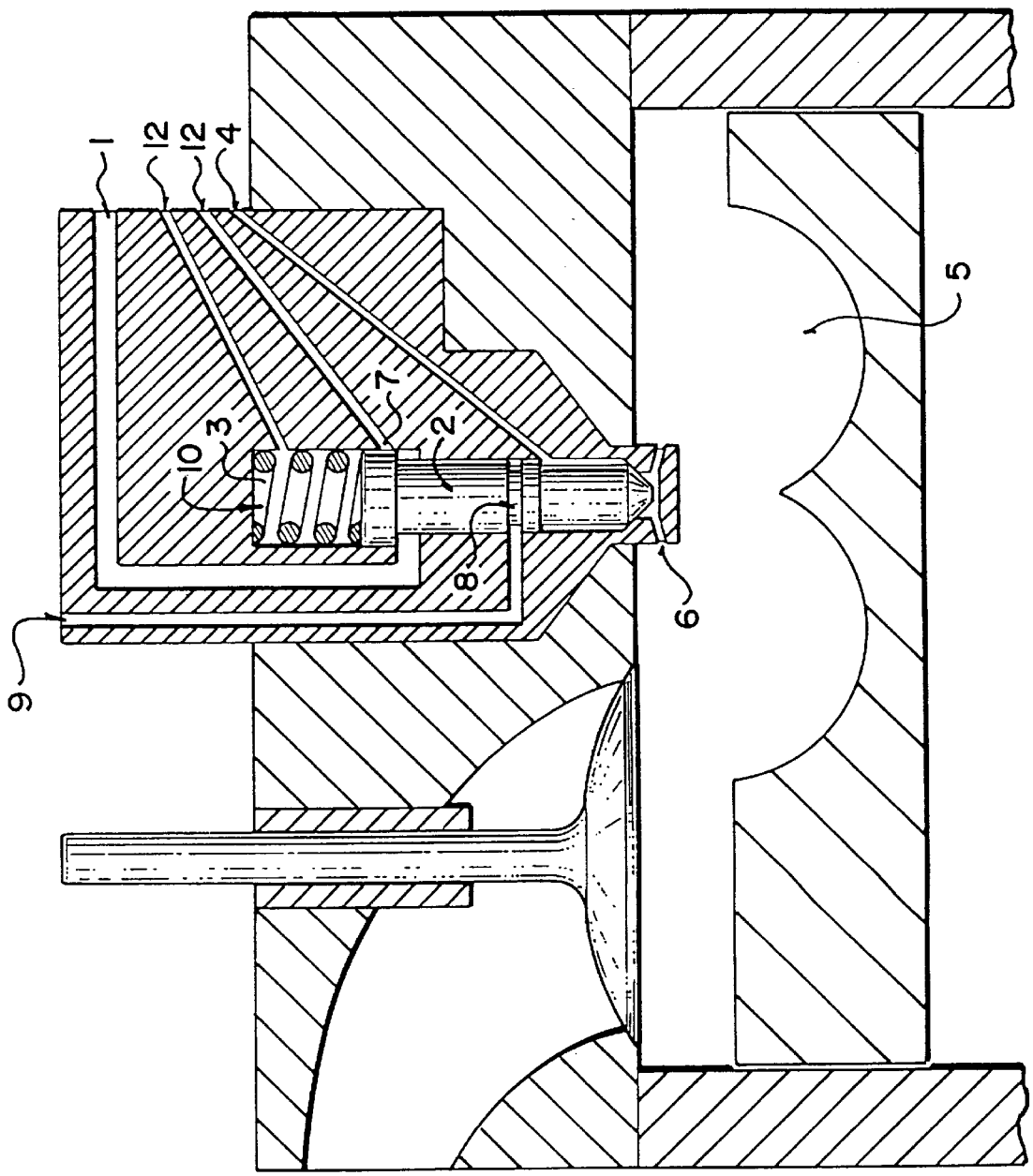

FIG. 2 illustrates a second embodiment of injector design including the features illustrated in FIG. 1 but replacing the relief valve (7 and 11 in FIG. 1) by a simple spill-over port 7 and 12. The spill-over port 7 is uncovered when the needle lifts up, in effect limiting the lift of the needle and the pressure in the injector. The distributor or in-line fuel injection pump used for the above injector could be mechanically or electronically controlled.

Figure 3:
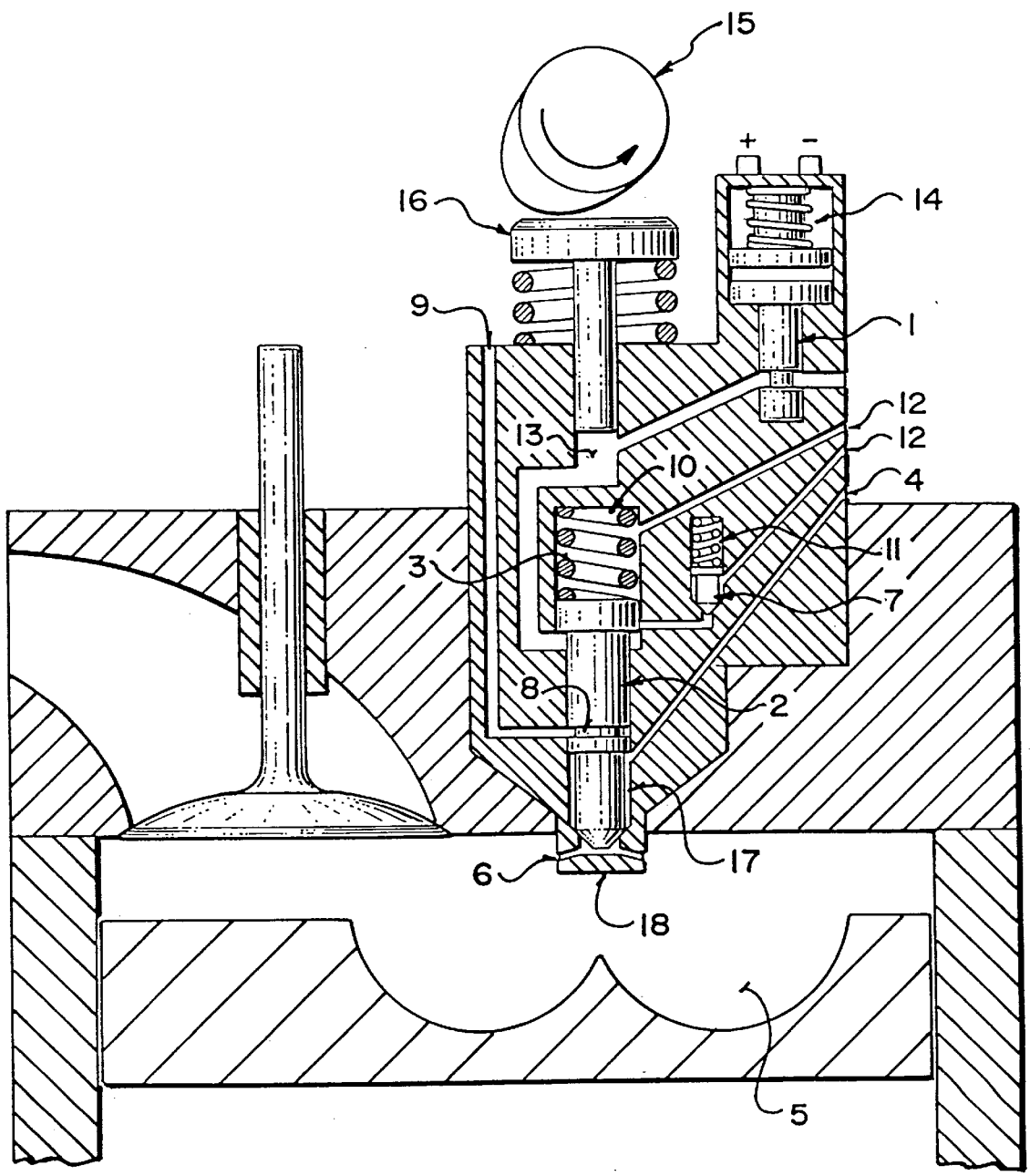
FIG. 3 shows a cross-section depiction of an embodiment of an injector for main fuel only with internal source of electronically controlled hydraulic actuation.

FIG. 3 illustrates a third embodiment of injector design including the features illustrated in FIG. 1 but including an internal (rather than an external) source of actuation. In the depicted embodiment, the actuation is provided by a engine-driven cam 15 and by an electronically controlled valve. As seen in FIG. 3, hydraulic oil at low pressure is fed through a valve 1 into chamber 13. Valve 1 is controlled by a solenoid 14. When the solenoid 14 is energized, the valve 1 closes. An engine-driven cam 15 pressurizes the hydraulic oil in chamber 13 by operation of a main plunger 16. As the hydraulic pressure of the hydraulic oil in chamber 13 which is connected underneath needle 2, reaches a certain level, the coil spring 3 that is holding the gas needle 2 in a lower position is overcome. The gas needle 2 then lifts up, and thereby lets natural gas introduced through channel 4 escape through the holes 6 at the tip 18 of the injector into the combustion chamber 5. A hydraulic pressure-limiting relief valve 7 is required in this embodiment, as discussed above in association with FIG. 1. However, a spill-port as shown in FIG. 2 could also be used. A seal 8, spring cages 10 and 11 and venting 12 are also used as discussed above in association with FIG. 1.

Figure 4:
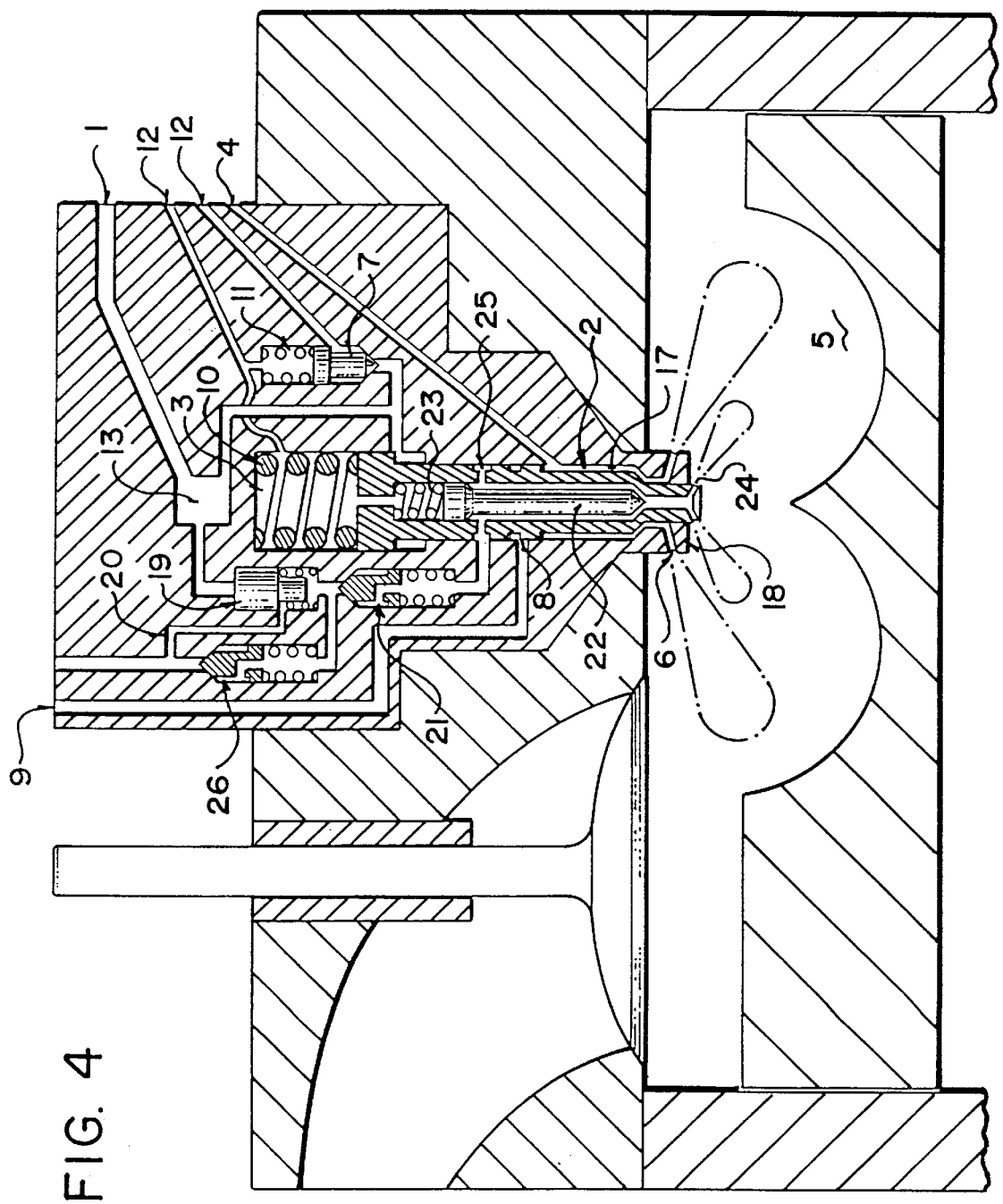
FIG. 4 shows a cross-section depiction of an embodiment of an injector for main fuel and pilot fuel with external source of hydraulic actuation and with pilot volume controlling device and with concentric double needle arrangement.

FIG. 4 illustrates a fourth embodiment of an injector design including the features illustrated in FIG. 1, regarding a main fuel, but with the addition of a pilot fuel injection system which is comprised of a pilot fuel needle 22, a pilot fuel metering valve 19, an intake valve 26 and a check valve 21. In the embodiment illustrated in FIG. 4, the pilot and main fuel needles are concentric. FIG. 4 relates to a fuel injection system which is controlled by a fuel-injection pump. As seen in FIG. 4, hydraulic oil from an in-line fuel injection pump or from a distributor-type fuel injection pump (not shown) is fed through port 1 and chamber 13. When the pump pressurizes the oil for injector actuation, a force is applied on the pilot metering valve 19. The metering valve 19 moves down, thereby blocking its intake port 20 and pressurizing the oil below it. The pressurized oil flows through the check valve 21 and under the pilot fuel needle 22, through special ports 25 in main gas fuel needle 2, which is below spring 3 and shown in section view. When the pressure is high enough that the pilot needle spring 23 is overcome, the pilot needle 22 lifts and pilot fuel is injected through holes 24 at the tip 18 of the injector. There may be any number of such holes 24 at the tip of the injector. The metering valve 19 has a finite stroke, and upon reaching the end of that stroke, the pressure no longer builds up. As fuel is injected, the pressure rapidly drops and the pilot needle closes. The check valve 21 prevents fuel from being drawn back from below the needle 22, thereby ensuring fast and repeatable actuation at each stroke. The pressure in chamber 13 keeps rising however, and after a time delay the pressure is high enough to overcome the main spring 3 which normally keeps the main gas needle 2 in place in a lower position. When main needle 2 is raised, main fuel fed through port 4 and channel 17 then flows into combustion chamber 5 through holes 6. There can be any number of holes 6, with an optimal number providing best combustion characteristics. The total area of holes 6 is generally larger than the total area of pilot fuel holes 24 to compensate for the difference in density between the main fuel and the pilot fuel. The embodiment in FIG. 4 also includes, as discussed in the above description relating to FIG. 1, a pressure-limiting device 11, a seal 8, and vents 12 for the spring cages 10 and 11. When the effective stroke of the pump is finished for the injector, the pressure in chamber 13 drops, and the main needle 2 closes by being returned to its seat by the main needle spring 3. An intake valve 26 is required to permit the metering plunger to return to its position. The intake valve 26 is operated by low-pressure oil.

Figure 5:
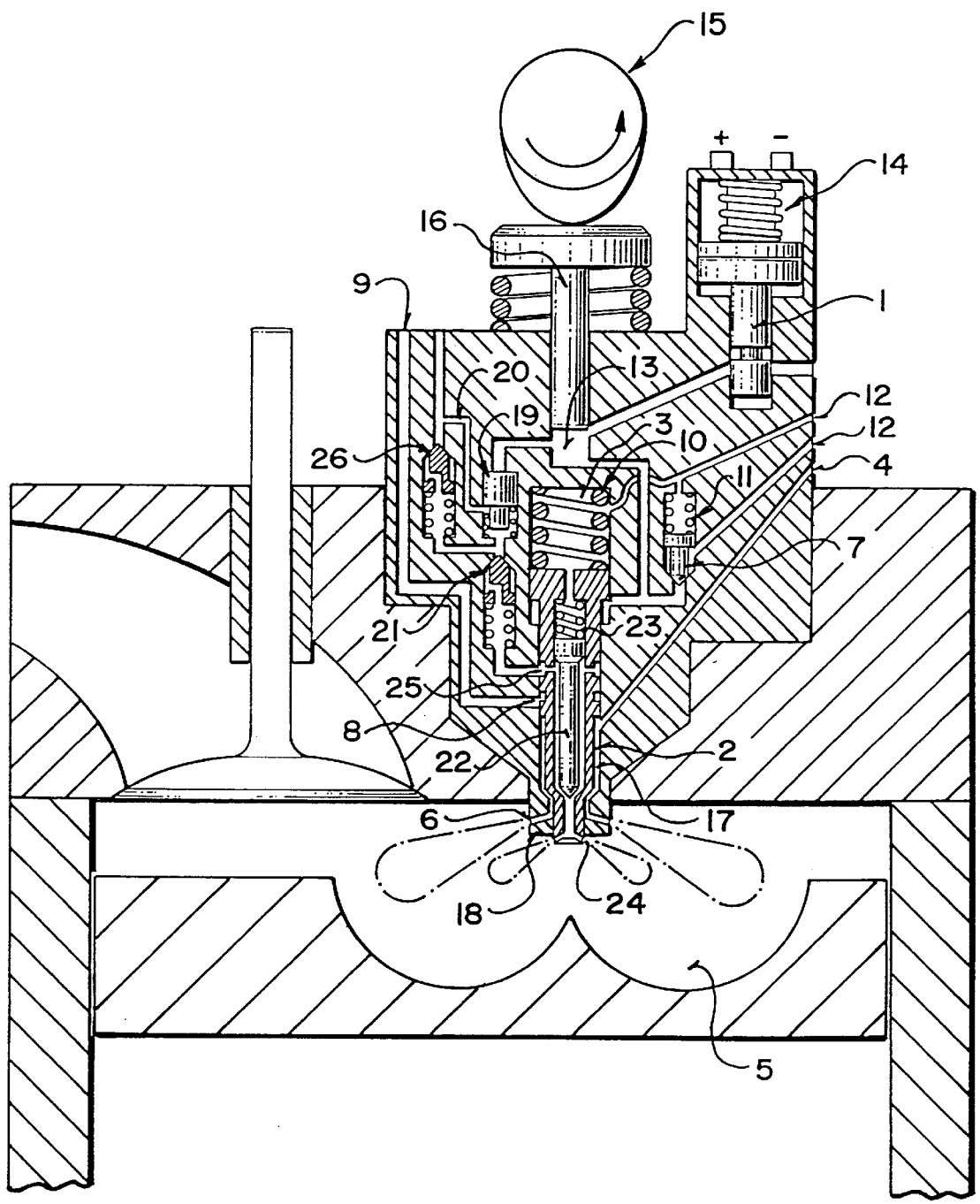
FIG. 5 shows a cross-section depiction of an embodiment of an injector for gaseous fuel and pilot fuel with internal source of electronically-controlled hydraulic actuation and with pilot volume controlling device and with concentric double needle arrangement.

FIG. 5 illustrates a fifth embodiment of an injector design including the features illustrated in FIG. 3, but with the addition of a pilot fuel injection system which is comprised of a pilot fuel needle 22, a pilot fuel metering valve 19, an intake valve 26 and a check valve 21. The main fuel needle 2 is shown in section. In the embodiment presented in FIG. 5, the pilot and main needles 2 and 22 are concentric. FIG. 5 relates to a fuel injection system which is internally controlled by an engine-driven cam 15 and an electronically controlled solenoid 14. The operation of the embodiment in FIG. 5 is similar to the operation described in FIG. 4, except that the high-pressure oil in chamber 13 is provided by the cam-driven plunger 16 upon energizing solenoid 14.

Figure 5A:
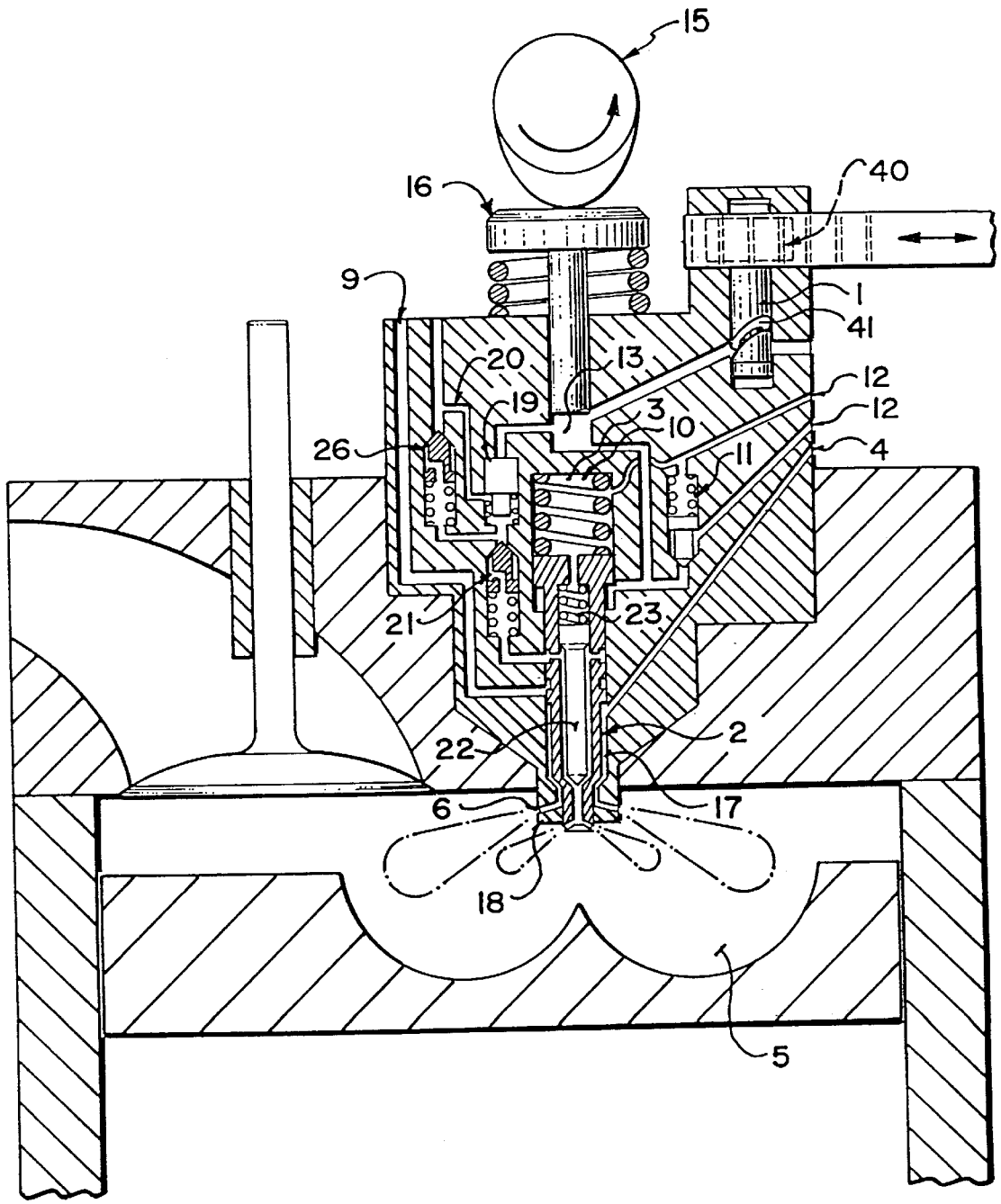
FIG. 5a shows a cross-section depiction of an embodiment of an injector for main fuel and pilot fuel with internal source of mechanically-controlled hydraulic actuation and with pilot volume-controlling device and with concentric double needle arrangement.

FIG. 5a illustrates an embodiment of an injector similar to that illustrated in FIG. 5, but with mechanical actuation rather than solenoid actuation of the valve 1. As an example of mechanical actuation, a rack and pinion mechanism 40 actuates a valve 1 with a helical groove 41 such that during its course the valve 1 can be opened or closed. Similar mechanical actuation can also be applied to the embodiments shown in FIGS. 3, 6, 7 and 8, if desired.

Figure 5B:
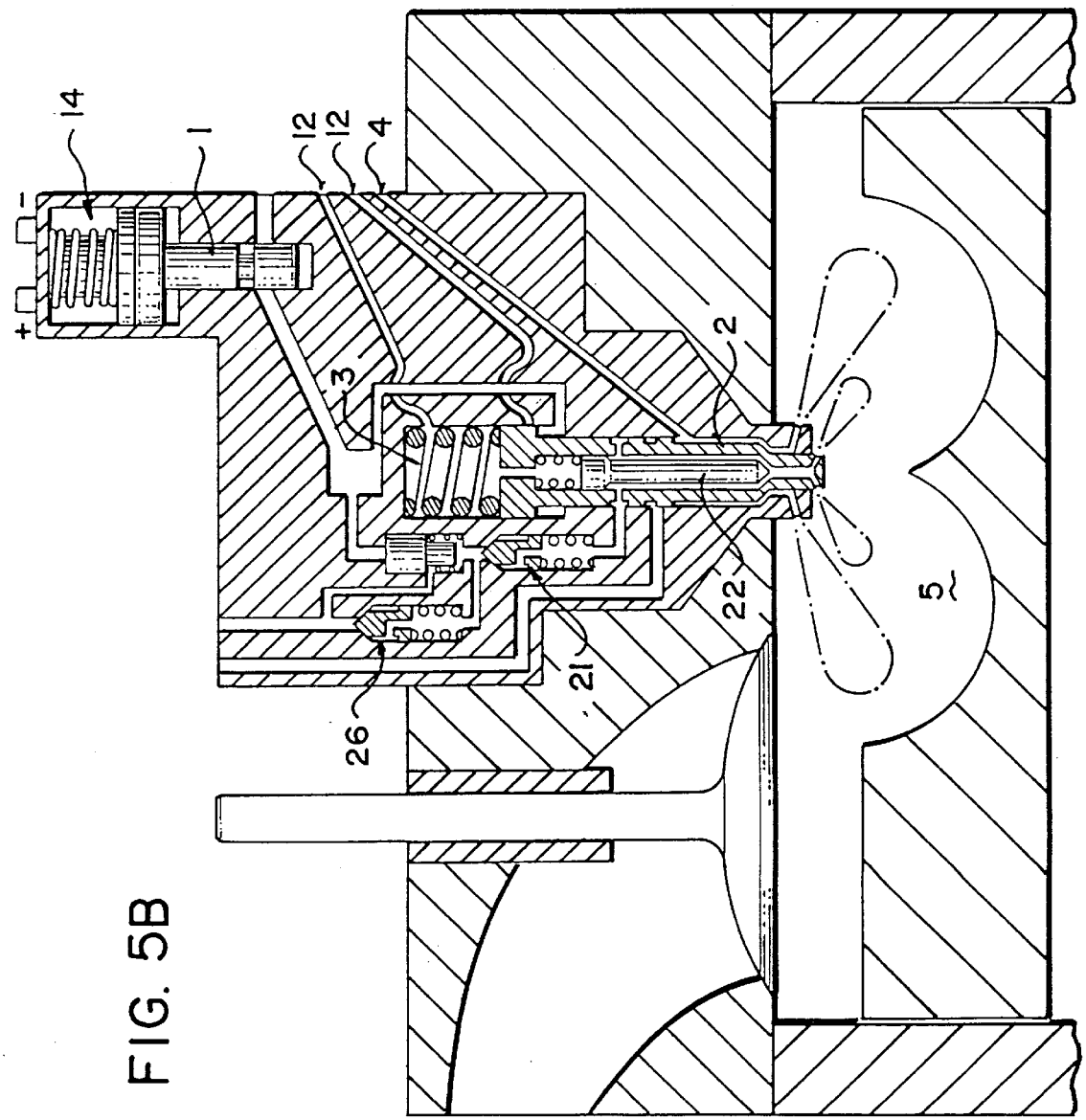
FIG. 5b shows a cross-section of an embodiment of an injector for gaseous fuel and pilot liquid fuel with external source of hydraulic pressure and internal electrically-controlled valve for the admission of the high-pressure actuating oil.

FIG. 5b illustrates an embodiment of an injector similar to that illustrated in FIG. 5, but with external pressurization (not shown) of the actuating oil, and internal means of admitting the high-pressure oil to the injector. As an example of internal means of admitting the high-pressure oil, an electrically operated valve 1 is shown. High-pressure actuating oil pressurized by an external pump is admitted to the valve 1 by the port. Similar combinations of external pressurization and internal admitting valve could also be applied to the embodiments shown in FIGS. 3, 6, 7 and 8 if desired.

Figure 6:
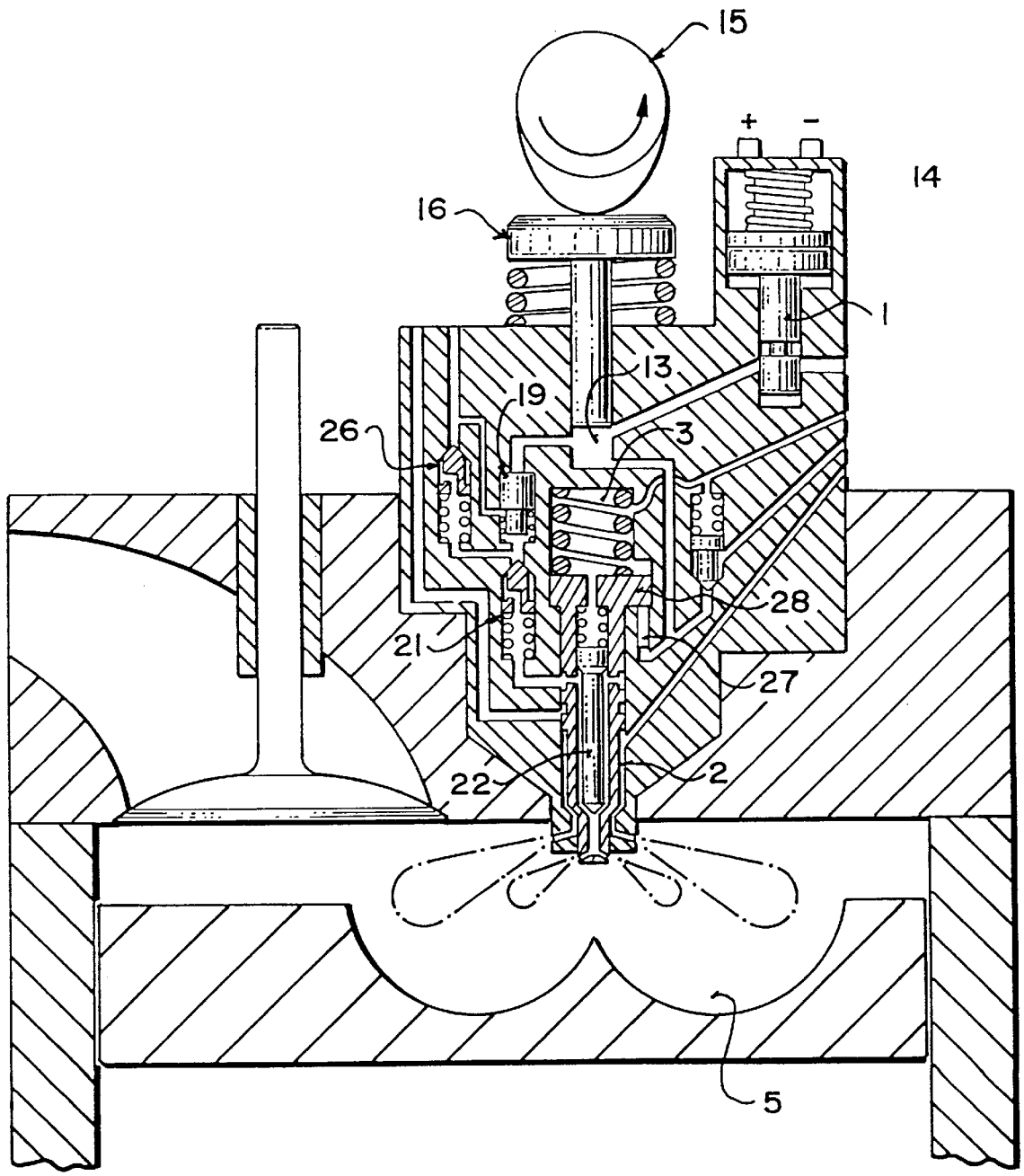
FIG. 6 shows a cross-section depiction of an embodiment of an injector for main fuel and pilot fuel with internal source of electronically-controlled hydraulic actuation and with pilot volume-controlling device and with a different means of lifting the gas needle and with concentric double needle arrangement.

FIG. 6 illustrates an embodiment of an injector design including the features illustrated in FIG. 5, but with a different method of actuating the main needle 2. In FIG. 5, the main needle 2 is actuated by the pressure differential acting on the main needle head 28. This design requires a very good fit between the main needle 2 and the injector bore on two different diameters. In FIG. 6, the main needle 2 is actuated by plunger 27 acting upwardly on the main needle head 28. Although one plunger 27 is shown in FIG. 6, two or more plungers could be used to actuate the main needle 2. This embodiment eliminates the need to have a precise machine fit of two diameters of the needle.

Figure 7:
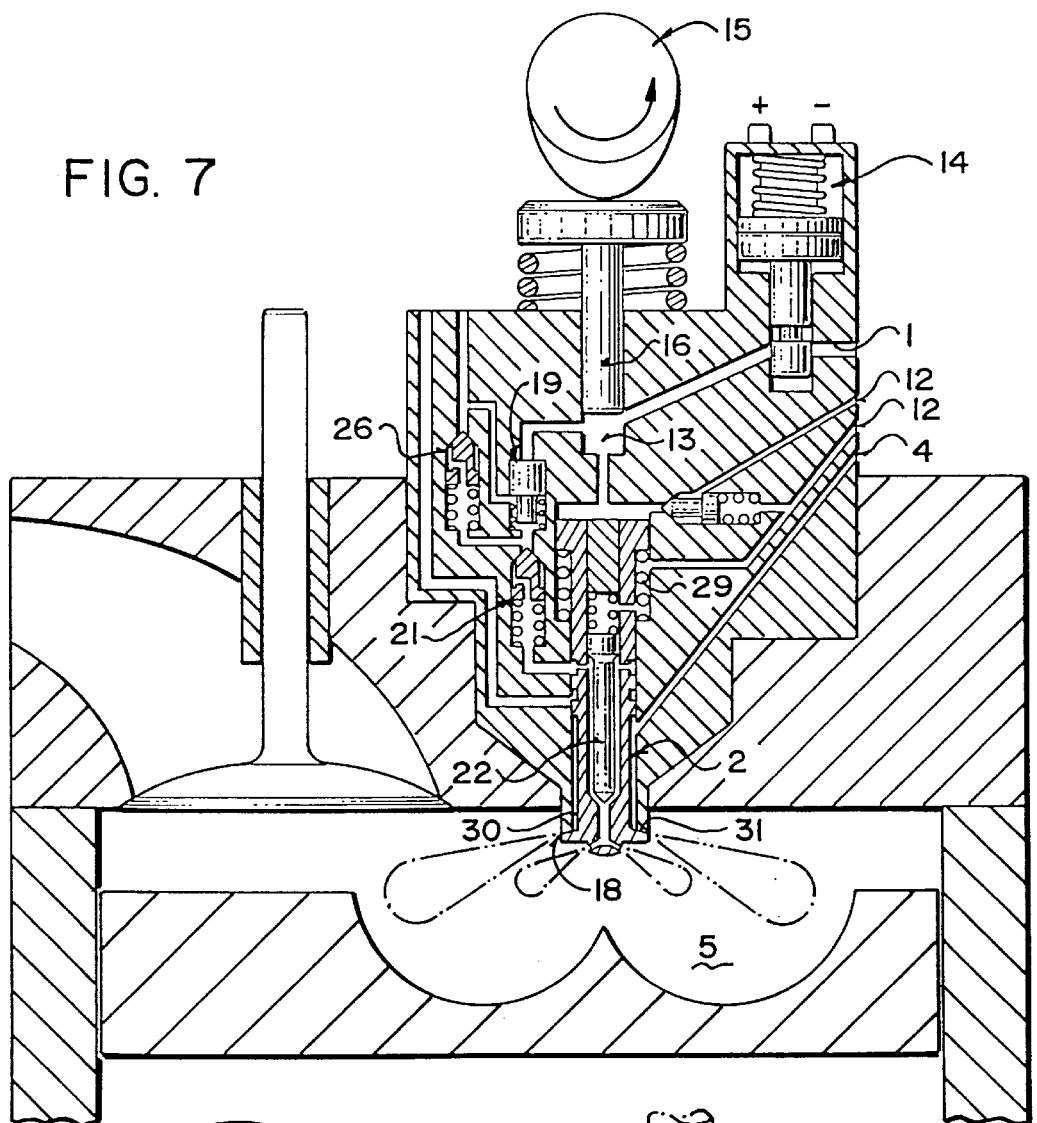
FIG. 7 shows a cross-section depiction of an embodiment of an injector for main fuel and pilot fuel with internal source of electronically-controlled hydraulic actuation and with pilot volume-controlling device and with concentric double needle arrangement and with a different means of opening the gas needle.

FIG. 7 illustrates an embodiment of an injector design including the features illustrated in FIG. 5, but with a different method of actuating the main needle 2. In this embodiment, the main needle 2 travels downwardly instead of upwardly. The operation is as above, described for the embodiment shown in FIG. 5, but high-pressure oil acts on the top of the needle 2, and pushes it down when the pressure is sufficient to overcome the spring 29. The main fuel is conveyed to the main needle 2 through port 4 and travels in vertical channels 30 to the injector tip 18. When the needle main 2 is pushed down, the ends of the channels 30 are exposed and the main fuel flows into the combustion chamber 5. The channels 30 are used to act as discrete holes around the circumference of the base of the needle 2. The main needle 2 seals at the surface 31.

Figure 7A:
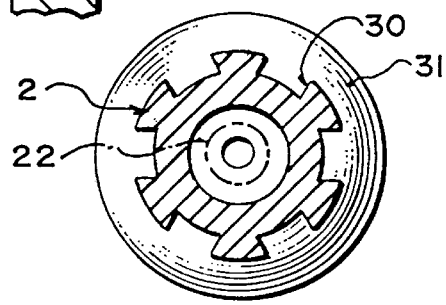
FIGS. 7a and 7b illustrate top and side-section views of the concentric double needle construction.
Figure 7B:
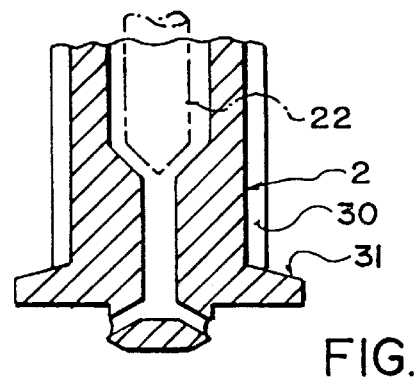

FIGS. 7a and 7b illustrate detailed top and side-section views of the inverted concentric double needle construction illustrated in FIG. 7. FIG. 7a illustrates the series of channels 30 around the circumference of the needle 2. FIG. 7b illustrates the seal 31 at the interface between the base of needle 2 and channels 30.

FIG. 8 illustrates an embodiment of an injector design including the features illustrated in FIG. 5, but with the two needles being arranged in a side-by-side configuration, rather than a concentric configuration as shown in FIGS. 5 and 7. FIGS. 8a and 8b illustrates side-section and top views of the side-by-side construction. The embodiment illustrated in FIG. 8 includes all of the features shown in FIG. 5. A high-pressure liquid seal 8 is still required between the channel 17 and the hydraulic actuation area on the main needle 2 to prevent main fuel bleeding into the hydraulic oil. The injection nozzle at the base requires a special configuration as indicated in FIG. 8, and also FIGS. 8a and 8b. The injection holes 32 (see FIG. 8b), in any number, must be distributed such as to clear the pilot injection tip 33 (see FIG. 8b), which itself contains in any number the pilot fuel injection holes.

In other embodiments of the injector, the source of the hydraulic actuation can include an internal cam and plunger means or an external pump means. In other embodiments of the injector, the timing and control means can be mechanical or electrical, and can be either internal to the injector unit or external of the injector unit.

In other embodiments, the hydraulically-actuated fuel injector can include needle operation components including the following:

1. Side-by-side needles instead of concentric needles;
2. Needles which travel up instead of down;
3. A plunger to raise the main needle; and
4. A check valve to maintain a high hydraulic pressure in the pilot needle area.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A hydraulically actuated fuel injection apparatus for injecting a high pressure compressible main fuel into an internal combustion engine, said apparatus comprising:

(a) an injector housing defining a valve chamber with an injector nozzle at an end proximate to a combustion chamber, said injector nozzle having at least one opening into the combustion chamber;

(b) a displaceable injection valve within said valve chamber and biased by a spring into seating against a valve seat formed in the valve chamber;

(c) a first port for introducing the main fuel into the valve chamber;

(d) a second port for introducing a hydraulic fluid into the valve chamber;

e) an actuator mechanism for generating a rising hydraulic pressure pulse in the hydraulic fluid to displace the injection valve in a direction opposite to the flow of main fuel upon the hydraulic fluid reaching a predetermined pressure level, thereby injecting the main fuel into the combustion chamber;

(f) a pressure limiting device located within the injector housing for relieving the pressure of the hydraulic fluid upon the pressure reaching a predetermined level.

2. A fuel injection apparatus as claimed in claim 1 wherein the actuator mechanism includes a timing control for admitting the hydraulic fluid at a predetermined time and for a predetermined duration.

3. A fuel injection apparatus as claimed in claim 1 wherein the actuator mechanism is a pump.

4. A fuel injection apparatus as claimed in claim 1 wherein timing and quantity of the main fuel injected are controlled by an electrically actuated valve.

5. A fuel injection apparatus as claimed in claim 2 wherein the timing control means is an electrically or mechanically actuated valve.

6. A fuel injection apparatus as claimed in claim 3 wherein the actuator mechanism is a cam and plunger mechanism driven by the engine to pressurize the hydraulic fluid.

7. A fuel injection apparatus as claimed in claim 1 wherein the pressure-limiting device comprises a spill-over port which is uncovered when the injection valve moves past a predetermined location.

8. A fuel injection apparatus as claimed in claim 1 wherein the injection valve is a needle, said needle reciprocally moving from a closed to an open position to permit the main fuel to pass through the valve chamber into the combustion chamber when the pressure of the hydraulic fluid reaches the predetermined level.

9. A fuel injection apparatus as claimed in claim 8 wherein the injector nozzle has a plurality of holes formed therein.

10. A fuel injection apparatus as claimed in claim 1 wherein a pilot fuel and a main fuel are injected through the valve chamber and into the combustion chamber.

11. A fuel injection apparatus as claimed in claim 10 wherein the pilot fuel is a liquid and the main fuel is a gas.

12. A fuel injection apparatus as claimed in claim 11 wherein the pilot fuel is diesel and the main fuel is natural gas.

13. A hydraulically actuated fuel injection apparatus for injecting a pilot fuel and a high pressure main fuel into an internal combustion engine, said apparatus comprising:
   (a) an injector housing defining a valve chamber with an injector nozzle at an end proximate to a combustion chamber, said injector nozzle having at least one opening into the combustion chamber;
   (b) a first displaceable injection valve within said valve chamber and biased by a spring into seating against a valve seat formed in the valve chamber for injecting the pilot fuel into the combustion chamber;
   (c) a second displaceable injection valve within said valve chamber and biased by a spring into seating against a valve seat formed in the valve chamber for injecting the main fuel into the combustion chamber;
   (d) a first port for introducing the pilot fuel into the valve chamber;
   (e) a second port for introducing the main fuel into the valve chamber;
   (f) an actuator mechanism for generating a rising hydraulic pressure pulse in a hydraulic fluid to displace the first injection valve upon the hydraulic fluid reaching a first predetermined pressure level and separately displacing the second injection valve upon the hydraulic fluid reaching a second predetermined pressure level thereby injecting the pilot fuel and the main fuel to be injected into the combustion chamber; and
   (g) a pressure limiting device for relieving the pressure of the hydraulic fluid upon the pressure reaching a predetermined level.

14. A fuel injection apparatus as claimed in claim 13 wherein each of the first and second injection valves is a needle, each said needle displaceable from a closed to an open position, the first needle permitting the pilot fuel to pass through the valve chamber into the combustion chamber and the second needle permitting the main fuel to pass through the valve chamber into the combustion chamber when the pressure of the hydraulic fluid reaches their respective predetermined levels.

15. A fuel injection apparatus as claimed in claim 13 wherein the pilot fuel and the main fuel are injected through separate openings into the combustion chamber.

16. A fuel injection apparatus as claimed in claim 13 further comprising a pilot fuel metering device.

17. A fuel injection apparatus as claimed in claim 16 wherein the pilot fuel metering device is closeable when a predetermined volume of fuel has been metered, thereby terminating injection of pilot fuel.

18. A fuel injection apparatus as claimed in claim 16 further comprising an intake port openable to prime the pilot fuel metering device and closeable when a predetermined volume of fuel has been metered.

19. A fuel injection apparatus as claimed in claim 16 wherein the pilot fuel metering device includes a limited-displacement plunger and a return spring to return the plunger to its original location once injection is completed.

20. A fuel injection apparatus as claimed in claim 16 wherein the pilot fuel metering device includes an intake valve which enables hydraulic fluid to be replenished as required between the metering device and the first displaceable injection valve.

21. A fuel injection apparatus as claimed in claim 13 wherein the main fuel and pilot fuel are injected into the combustion chamber with a concentric double-needle injection system.

22. A fuel injection apparatus as claimed in claim 13 wherein the two fuels are injected into the combustion chamber by a side-by-side double needle system.

23. A fuel injection apparatus as claimed in claim 13 wherein at least one of the components of the fuel injection apparatus are sealed from one another by hydraulic fluid seals.

24. A fuel injection apparatus as claimed in claim 13 wherein the pilot fuel is diesel fuel which simultaneously functions as hydraulic fluid.

25. A method of injecting a main fuel into an internal combustion engine comprising:
   (a) introducing the main fuel into a valve chamber;
   (b) introducing a hydraulic fluid into the valve chamber;
   (c) generating a rising hydraulic pressure in the hydraulic fluid to actuate a displaceable injection valve, thereby enabling the main fuel to be injected into a combustion chamber; and
   (d) relieving the pressure of the hydraulic fluid pressure reaches a predetermined level.

26. A method as claimed in claim 25 further comprising controlling timing and duration of the hydraulic fluid flow.

27. A method as claimed in claim 25 wherein timing and quantity of main fuel injected are controlled by an electrically or a mechanically actuated valve.

28. A method as claimed in claim 26 wherein the timing control is an electrically or mechanically actuated valve.

29. A method as claimed in claim 25 wherein the hydraulic fluid is pressurized by a cam and plunger mechanism driven by the engine.

30. A method as claimed in claim 29 wherein the pressure of the hydraulic fluid is relieved by a spill-over port which is uncovered when the injection valve moves past a predetermined location.

31. A method as claimed in claim 25 wherein a pilot fuel and a main fuel are injected into the combustion chamber.

32. A method as claimed in claim 31 wherein the pilot fuel is a liquid and the main fuel is a gas.

33. A method as claimed in claim 32 wherein the pilot fuel is diesel and the main fuel is natural gas.

34. A method of injecting a pilot fuel and a main fuel into an internal combustion engine comprising:
   (a) introducing the pilot fuel into a valve chamber;
   (b) introducing the main fuel into the valve chamber;
   (c) introducing a hydraulic fluid into the valve chamber;

(d) generating a rising hydraulic pressure in the hydraulic fluid to displace a first injection valve upon the hydraulic fluid reaching a first predetermined pressure level, thereby enabling the pilot fuel to be injected into the combustion chamber, and separately displacing a second injection valve upon the hydraulic fluid pressure reaching a second predetermined level, thereby injecting the main fuel into the combustion chamber;

(e) relieving the pressure of the hydraulic fluid when the pressure reaches a third predetermined level.

35. A method as claimed in claim 34 wherein each of the first and second injection valves is a needle, said needle displaceable from a closed to an open position, the first needle permitting the pilot fuel to pass through the valve chamber into the combustion chamber and the second needle permitting the main fuel to pass through the valve chamber into the combustion chamber when the pressure of the hydraulic fluid reaches their respective predetermined levels.

36. A method as claimed in claim 31 wherein the pilot fuel and the main fuel are injected through separate openings into the combustion chamber.

37. A method as claimed in claim 31 further comprising metering fuel by a pilot fuel metering device.

38. A method as claimed in claim 30 wherein metering of the pilot fuel terminates after a predetermined duration, thereby decreasing the hydraulic fluid pressure between the metering device and the first displaceable injection valve, whereby said second injection valve is closed and pilot fuel injection is terminated.

39. A method as claimed in claim 30 further comprising priming the pilot fuel metering device by opening an intake port and subsequently closing the intake port when a predetermined volume of fuel has been metered.

40. A method as claimed in claim 30 wherein metering of the pilot fuel is accomplished by the displacement of a limited-displacement plunger which determines the volume of pilot fuel injected, and a return spring for returning the plunger to its original position once injection is completed.

41. A method as claimed in claim 30 further comprising replenishing the hydraulic fluid as required between the metering device and the first displaceable injection valve by opening an intake valve.

42. A method as claimed in claim 34 wherein the the main fuel and pilot fuel are injected into the combustion chamber with a concentric double-needle injection system.

43. A method as claimed in claim 34 wherein the the main fuel and pilot fuel are injected into the combustion chamber by a side-by-side double needle system.

44. A method as claimed in claim 25 further comprising sealing of at least some of the components of the fuel injection apparatus from one another by hydraulic fluid seals.

45. A method as claimed in claim 33 wherein the pilot fuel is diesel fuel which simultaneously functions as hydraulic fluid.

46. A fuel injection apparatus as claimed in claim 1 wherein at least one of the components of the fuel injection apparatus are sealed from one another by hydraulic fluid seals.

47. A fuel injection apparatus as claimed in claim 8 wherein a second valve chamber with a second injector nozzle at an end proximate to the combustion chamber is provided within the injector housing for housing the second displaceable injection valve.

48. A fuel injection apparatus as claimed in claim 8 wherein the pressure limiting device is located within the injector housing.

49. A fuel injection apparatus as claimed in claim 8 wherein the pilot fuel is a liquid and the main fuel is a gas.

50. A fuel injection apparatus as claimed in claim 20 wherein the pilot fuel is diesel and the main fuel is natural gas.

51. A method as claimed in claim 25 wherein the injection valve is a needle, said needle displaceable from a closed to an open position to permit the main fuel to pass through the valve chamber into the combustion chamber when the hydraulic fluid reaches the predetermined pressure level.

52. A method as claimed in claim 25 wherein when the needle moves to an open position when the pressure of the hydraulic fluid reaches the predetermined level, thereby allowing the main fuel to pass through holes in a tip of a nozzle.

53. A method as claimed in claim 25 further comprising sealing of at least some of the components of the fuel injection apparatus from one another.

54. A method as claimed in claim 31 wherein the pilot fuel and the main fuel are injected through separate openings into the combustion chamber.

55. A method as claimed in claim 31 wherein the pilot fuel is a liquid and the main fuel is a gas.

56. A method as claimed in claim 37 wherein the pilot fuel is diesel and the main fuel is natural gas.

* * * * *